Nov. 6, 1956
H. J. REINIG
2,769,608
BELLOWS VALVES
Filed July 31, 1952
2 Sheets-Sheet 1
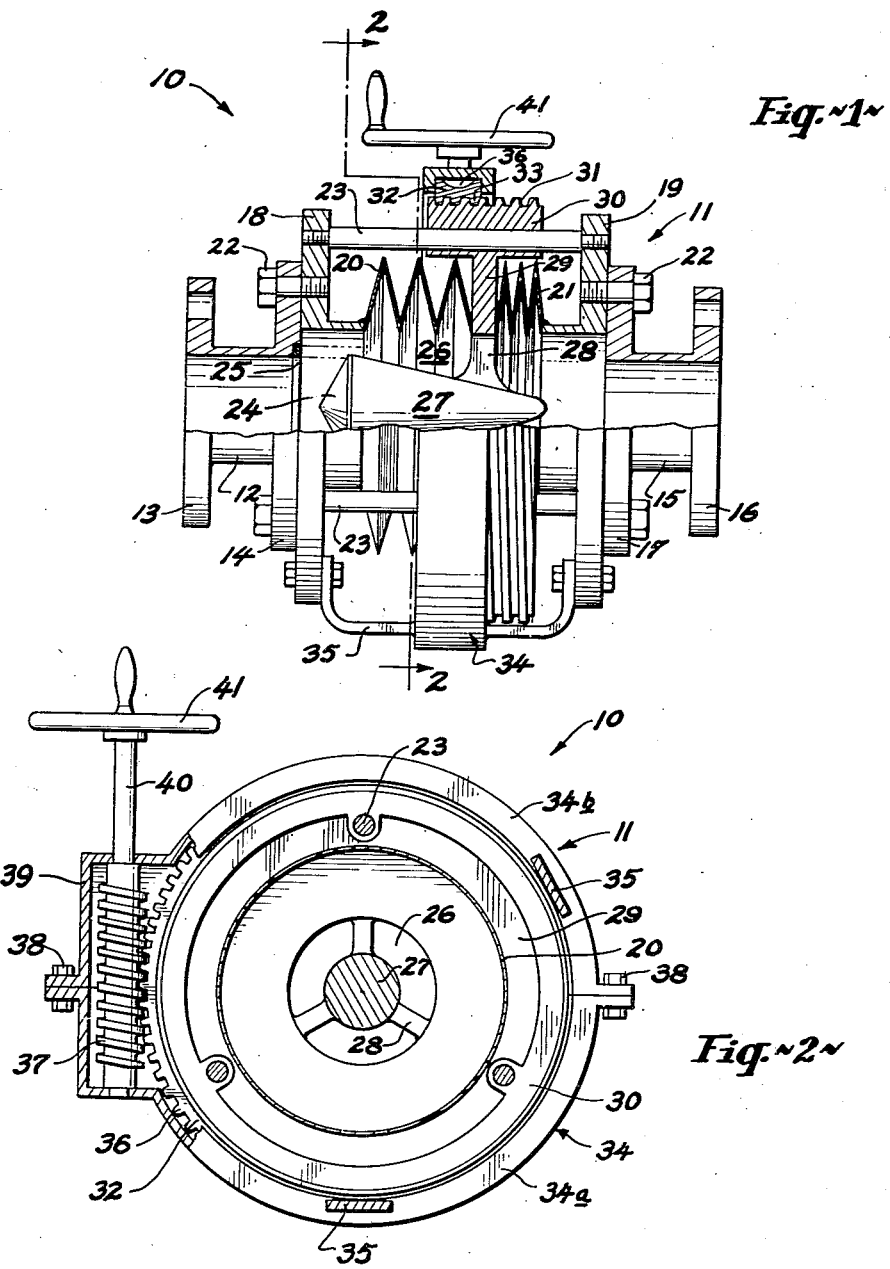
Fig.~1~
Fig.~2~
INVENTOR.
HENRY J. REINIG
BY Pollard and Johnston
ATTORNEYS Nov. 6, 1956 H. J. REINIG 2,769,608
BELLOWS VALVES
Filed July 31, 1952 2 Sheets-Sheet 2
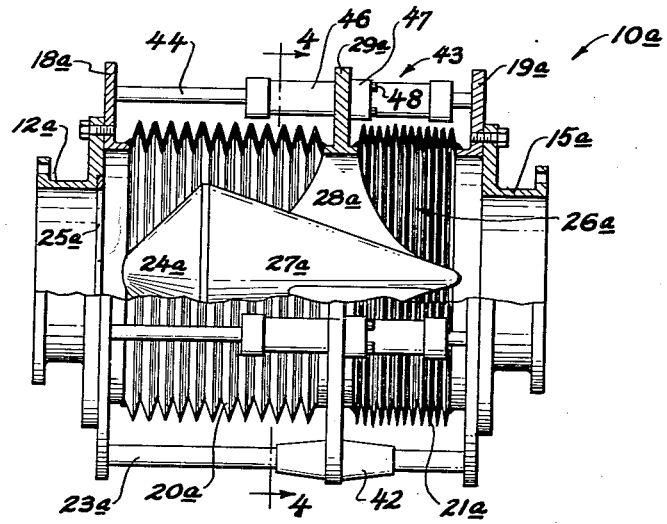
Fig.~3~
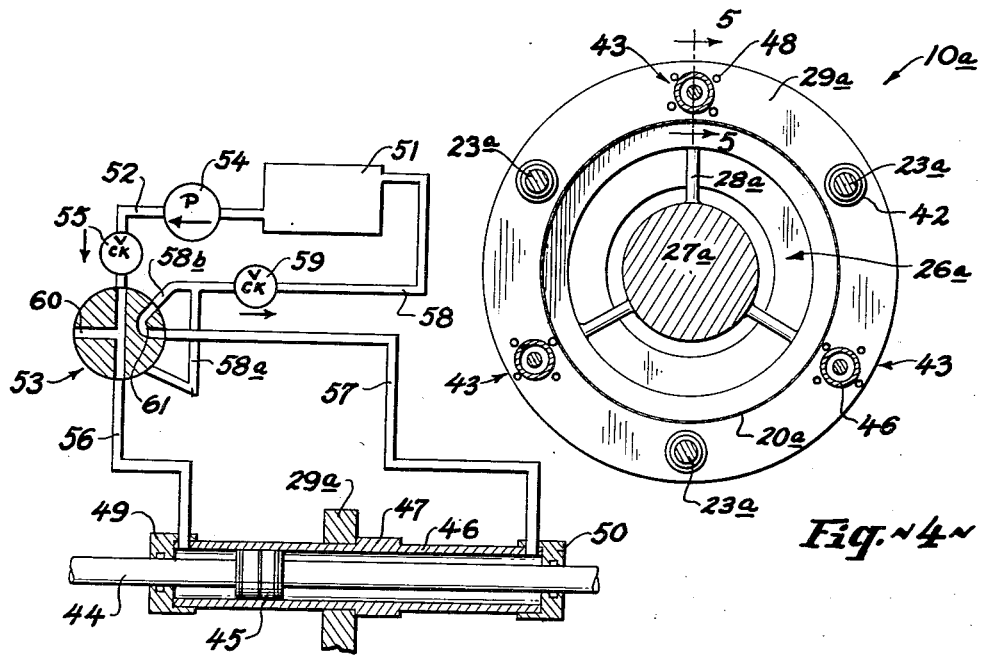
Fig.~5~ Fig.~4~
INVENTOR.
HENRY J. REINIG
BY Pollard and Johnston
ATTORNEYS

United States Patent Office 2,769,608
Patented Nov. 6, 1956

2,769,608

BELLOWS VALVES

Henry J. Reinig, Bergenfield, N. J., assignor, by mesne assignments, to Singmaster & Breyer, Inc., New York, N. Y., a corporation of New York Application July 31, 1953, Serial No. 371,480

10 Claims. (Cl. 251—31)

The present invention relates to valves, and it is the general object of the present invention to provide a valve having a passage through which the controlled or regulated fluid flows and which is completely sealed or isolated relative to the exterior of the valve as well as the valve actuating mechanism so that leaking of the controlled fluid to the outside of the valve and contamination of the controlled fluid from the outside of the valve or from substances on the valve actuating mechanism may be effectively prevented.

Heretofore, most valves included a valve housing through which the fluid to be controlled passed and a valve member movable in the housing to more or less obstruct the fluid flow through the valve housing, with a valve stem or actuating rod extending from the valve member through a wall of the valve housing either slidably or rotatably to some manipulating mechanism at the exterior of the valve housing. Such valves require a packing or sealing gland around the slidable or rotatable valve stem at the location where the latter passes through the wall of the valve housing in order to prevent leaking of the controlled fluid out of the valve housing around the valve stem. However, such packings or sealing glands are effective, if at all, for only limited operational periods and must be replaced from time to time. The use of packings or sealing glands around the valve stem or actuating rod also tends to complicate the valve structure and thereby increases the initial cost as well as the maintenance costs. Further, the fluid being handled by the valve, for example, in a chemical plant and the like, may be of a kind which chemically attacks the materials normally employed for the packings or sealing glands, and in that event expensive substitute materials must be developed.

Recognizing the above difficulties, special valves of the "gate" type have been developed wherein a flexible bellows is substituted for the conventional packing or sealing gland around the actuating rod at the location where the latter passes through the wall of the valve housing. However, such a bellows, by reason of its relatively small diameter and consequent limited extensibility for each fold thereof, must have a great length to permit the longitudinal movement of the actuating rod through the full range required for opening and closing of the valve gate. Thus, such a special gate valve is undesirably bulky and must be installed in a particular position for proper operation. Still other valves have been proposed in an effort to avoid the necessity for packings or sealing glands and such valves have the valve actuating mechanism installed within the valve housing. These last mentioned valves are subject to the objection that lubricant, or other foreign substances, on the valve actuating mechanism may contaminate the controlled fluid flowing therearound and are therefore not suitable for use in food processing plants and the like where the purity of the controlled fluid must be maintained.

Accordingly, it is a specific object of the present invention to provide a valve wherein the valve member is movable toward and away from a valve seat within the valve housing and is controlled from the exterior of the valve housing through a force transmitting structure which neither slides nor rotates relative to the valve housing and thereby eliminates any need for a packing or sealing gland at the location where the force transmitting structure extends through the valve housing.

Another object is to provide a valve of the described character wherein the fluid flow through the valve is substantially stream-lined or non-turbulent to thereby minimize the pressure drop across the valve.

A further object is to provide a valve of the described character wherein the external dimensions thereof are held as closely as possible to the diameter of the pipe or conduit through which the controlled fluid flows.

In accordance with the present invention a fluid control valve is provided with a valve housing having an inlet and an outlet and a flexible bellows interposed between the inlet and outlet and defining a passage therebetween for the controlled fluid. A valve member is movable longitudinally within the bellows toward and away from a valve seat adjacent the inlet of the housing and is supported by positioning means located exteriorly of the bellows. The positioning means has an extension which extends to the movable valve member through and in sealed relation to the walls of the bellows. One aspect of the invention provides a mechanical system disposed wholly outside of the bellows for effecting the valve controlling movements of the supporting positioning means, while another aspect of the invention employs an externally disposed, pressure-fluid operated system for producing such valve controlling movements. In either case, the bellows flexes in response to the movements of the valve supporting positioning means to permit movement of the valve member toward and away from its seat while preserving the fluid-tight character of the valve housing.

Valves constructed according to the present invention have a number of important advantages which make them suitable for uses for which known valves are not satisfactory. Among such uses is the control of streams of radio-active materials at high temperature and pressures, without danger of leakage or of malfunctioning due to differential expansions of moving parts, and with no need for lubrication or inspections of the internal valve elements.

The foregoing and other objects, features and advantages of the present invention will be apparent in the following detailed description of illustrative embodiments thereof which are presented merely by way of example and are shown in the accompanying drawings forming a part hereof, wherein:

Fig. 1 is a side elevational view, partly broken away and in section, of a valve embodying the present invention;

Fig. 2 is a transverse sectional view taken along the line 2—2 of Fig. 1;

Fig. 3 is a side elevational view, partly broken away and in section, of a valve constructed according to another embodiment of the invention;

Fig. 4 is a transverse sectional view taken along the line 4—4 of Fig. 3; and

Fig. 5 is a longitudinal sectional view of a portion of the valve in Figs. 3 and 4 taken along the line 5—5 of Fig. 4, but on an enlarged scale and with an hydraulic control system shown diagrammatically.

Referring to the drawings in detail, and initially to Figs. 1 and 2 thereof, a fluid control valve embodying the present invention is there illustrated and generally identified by the reference numeral 10. The valve 10 includes a housing, generally identified by the reference numeral 11, which is preferably formed by a cylindrical inlet section 12 having radial flanges 13 and 14 at its opposite ends, a cylindrical outlet section 15 having radial flanges 16 and 17 at its opposite ends, and an intermediate section interposed between the inlet and outlet sections and made up of flange rings 18 and 19 and cylindrical bellows 20 and 21 hereinafter referred to in detail.

The flange rings 18 and 19 are bolted, or otherwise secured, to flanges 14 and 17 of the inlet and outlet sections, respectively, as at 22, and the flange rings are rigidly connected together by a series of axially extending tie-bolts 23 which, in the illustrated embodiment, are threadably engaged at their opposite ends in suitably tapped openings in flange rings 18 and 19.

Preferably, flange rings 18 and 19 and bellows 20 and 21 have inner diameters greater than the inner diameters of the inlet and outlet sections 12 and 15, while the latter are substantially the same size as the pipe or conduit sections (not shown) to which they may be connected by the flanges 13 and 16 and through which the fluid to be controlled flows.

A valve member 24 is disposed within the space defined by flexible bellows 20 and 21 and is movable longitudinally toward and away from a valve seat 25 formed at the inner edge of flange 18 of the inlet section. The valve member 24 has a maximum diameter substantially smaller than the inner diameter of the bellows so that an annular flow passage 26 is defined therebetween to carry the fluid that passes between seat 25 and valve member 24 from the inlet section to the outlet section of the valve housing. A streamlined support 27 carries the valve member and has legs 28 radiating therefrom which are integral, at their outer ends, with a valve actuating ring 29 having an inner diameter substantially the same as that of the bellows 20 and 21. The outer edge or periphery of valve actuating ring 29 is axially enlarged to form a rim 30 having axially extending bored bosses through which the tie-bolts 23 slidably extend. The opposite ends of flexible bellows 20 are secured, for example, by welding, to flange ring 18 and actuating ring 29, while the opposite ends of flexible bellows 21 are similarly secured to the valve actuating ring and flange ring 19. Thus, the valve member 24 is slidably supported from the tie-bolts 23, while the bellows 20 and 21 preserve the fluid-tight character of the fluid flow passage 26 during movement of the valve member toward and away from valve seat 25.

In order to effect the movements of valve member 24 toward and away from valve seat 25, the valve 10 illustrated in Figs. 1 and 2 includes a thread 31 on the external surface of rim 30 and a ring gear 32 which is rotatable about the rim 30 and is formed with an internal thread 33 meshing with thread 31 on the rim. The ring gear 32 is held against axial movement, for example, in an inwardly opening circular channel member 34 which is supported by legs 35 spanning the space between, and secured to, flange rings 18 and 19, and a worm gear 36 is formed on the outer surface of ring gear 32. A worm 37 is supported for rotation about an axis which is parallel to a tangent to the ring gear 32 and meshes with worm gear 36 on the latter so that rotation of the worm 37 effects rotation of ring gear 32, while the meshing threads 31 and 33 of rim 30 and ring gear 32, respectively, produce axial displacement of the non-rotatable actuating ring 29 in response to the rotation of the ring gear 32. It is apparent that such axial displacement of actuating ring 29 causes expansion of one, and contraction of the other, of the flexible bellows 20 and 21, and moves valve member 24 either toward or away from valve seat 25 depending upon the direction of rotation of worm 37, and consequently of ring gear 32.

As seen in Fig. 2, channel member 34 is preferably formed in two separable parts 34a and 34b which are removably bolted together at their ends, as at 38, for ease of assembly, and at one end parts 34a and 34b are enlarged to define a housing 39 for worm 37 with the latter being journalled at its opposite ends in that housing. A shaft 40 extends from the upper end of worm 37 out of housing 39 and is provided with a hand-wheel 41 for manual actuation of the valve. Of course, it is to be understood that the valve 10 may be operated by other than manual actuation, for example, a reversible electric motor (not shown) may be coupled to the shaft 40 for causing the desired rotation of the latter. Further, while the outer surfaces of bellows 20 and 21 are exposed, it is to be understood that the spaces between legs 35 supporting channel member 34 may be filled in or closed to define an outer housing (not shown) surrounding the flexible bellows between flange rings 18 and 19.

Although the valve operated manually as described above in connection with Figs. 1 and 2 is generally suitable for the control of fluid flow through pipes up to the nominal size of ten inches, the control of fluid flow through larger pipes or conduits may require an alternative arrangement for moving the valve member relative to the valve seat. Referring in detail to Figs. 3, 4 and 5 of the drawings, another embodiment of the present invention is there illustrated and generally identified by the reference numeral 10a. Valve 10a is generally similar to valve 10 of Figs. 1 and 2, with the exception of the means employed for effecting opening and closing of the valve, and includes an inlet section 12a and an outlet section 15a respectively secured to flange rings 18a and 19a, with flexible bellows 20a and 21a extending between a valve actuating ring 29a and flange rings 18a and 19a, respectively, to define a flow passage 26a between the inlet and outlet sections.

Legs 28a extend radially inward from the actuating ring 29a and at their inner ends support a streamlined carrier 27a having a valve member 24a mounted on its forward end for movement with the actuating ring and carrier toward and away from a valve seat 25a on inlet section 12a. Valve actuating ring 29a is formed with bored bosses 42 which slidably receive tie-bolts or rods 23a extending between flange rings 18a and 19a so that such tie-bolts serve to prevent rotation of the actuating ring and to guide the axial movements of the latter.

Axial movement of actuating ring 29a is effected by several fluid pressure operated cylinder assemblies, each generally identified by the reference numeral 43 and including a piston rod 44 fixedly secured at its opposite ends to flange rings 18a and 19a and having a piston 45 thereon (Fig. 5), and a cylinder 46. Cylinder 46 slidably receives piston 45 of the related assembly and passes through a suitable opening in the peripheral portion of actuating ring 29a, with a flange 47 being formed on the cylinder intermediate the ends of the latter and secured, as by bolts 48, to ring 29a. Suitable heads 49 and 50 (Fig. 5) close the opposite ends of cylinder 46 and include conventional sealing glands through which piston rod 44 slidably extends.

From the foregoing, it is apparent that each cylinder 46, and with it actuating ring 29a, will be displaced axially relative to the related piston rod 44 when a pressure fluid, whether hydraulic or pneumatic, is admitted to one end or the other of the cylinder to act against a face of piston 45. Thus, by controlling the flow of a pressure fluid to the several cylinders 46, the valve member 24a can be displaced axially to control the flow of fluid through the passage 26a.

In Fig. 5, a suitable system for controlling the supply of pressure fluid to one of the cylinders 46 is shown schematically and merely by way of example. This system includes a source 51, which may be in the form of a storage tank for an hydraulic fluid, and a supply pipe or line 52 leading from source 51 to a selector valve 53 and having a pump 54 and a check-valve 55 interposed therein. Supply lines 56 and 57 extend from the selector valve 53 to the heads 49 and 50, respectively, at the opposite ends of the cylinder 46, and a return line 58, having two branches 58a and 58b, extends from selector valve 53 back to the source 51 and has a check-valve 59 interposed therein.

The core of selector valve 53 is formed with a T-shaped supply passage 60 which, in the illustrated position of the valve core, communicates supply line 52 with supply line 56, and, in a position turned 90° from that illustrated in Fig. 5, places the supply line 52 in communication with the supply line 57. The core of valve 53 also is formed with a return passage 61 which, in the illustrated position of the selector valve, places the line 57 with branch 58b of the return line 58, and, in a position turned 90° from that illustrated in the drawings, places the line 56 in communication with branch 58a of the return line. Thus, by manipulating the core of selector valve 53, pressure fluid can be supplied to one or the other of the ends of cylinder 46 while the end of the cylinder then cut-off from the supply is placed in communication with the return line to the source 51 to permit movement of the cylinder relative to piston 45. It is apparent that the cylinder 46 may be fixed axially on the piston rod 44 to maintain valve member 24a in a desired position relative to the valve seat merely by rotationally adjusting the core of selector valve 53 to a position in which the lines 56 and 57 are cut-off from communication with either the supply line 52 or the return line 58. Thus, the position of valve member 24a will not be affected by the pressure of the fluid controlled by valve 10a.

It is to be noted that the first described valve 10 is similarly insensitive to the pressure of the controlled fluid since worm 37, worm gear 36 and meshing gears 31 and 33 provide an irreversible drive for the valve actuating ring 29, that is, a drive in which a rotational force applied to worm 37 results in axial movement of ring 29 and valve member 24, but an axial force applied against the valve member 24 cannot produce rotation of worm 37, and the valve member will therefore maintain its set position without constant supervision.

Further, it will be noted that the flexible bellows of valves 10 and 10a define a fluid-tight passage 26 or 26a between the inlets and outlets of the respective valves, and that the absence of any valve actuating members extending either slidably or rotationally through the valve housing wall of each of these valves eliminates any need for packings or sealing glands to prevent leaking of the controlled fluid around such actuating members, as in conventional valves. Therefore, valves embodying the present invention are particularly suitable for use in chemical apparatus and the like wherein the materials handled may be hazardous or extraordinarily difficult to handle, or where they may destroy the conventional packings, or where the need for a gas-tight valve is particularly acute. The flexible bellows of the described valves also serve to separate the flow passages for the controlled fluid from the valve actuating mechanisms thereby avoiding any possibility that foreign matter, such as a lubricant or hydraulic actuating fluid, may contaminate the controlled fluid. This characteristic of the valves will be particularly important in connection with their use in food processing plants or apparatus. Finally, the valves described herein provide flow passages for the controlled fluid which avoid any sharp or sudden changes in direction or cross-sectional area so that the pressure drop across such valves is substantially minimized and the valves may be employed in installations where a small pressure drop is particularly desirable.

While certain specific embodiments of the invention have been described in detail and shown in the accompanying drawings merely by way of example, it is to be understood that the invention is not limited to these precise embodiments and that various changes and modifications may be effected therein without departing from the spirit or scope of the invention.

What is claimed is:

1. A fluid control valve comprising rigid end sections spaced apart and forming valve ports, fluid tight flexible bellows sealed at opposite ends thereof to said end sections and forming a tubular valve body for conducting the controlled fluid between said ports, a fixed valve member on one of said end sections, a complementary movable valve member within said bellows, and positioning means located exteriorly of said bellows and having an extension extending to said movable member through and in sealed relation to walls of said bellows, said movable valve member being supported by said positioning means and being movable thereby to and from said fixed valve member to close and open the valve, said bellows being displaced with movements of said positioning means but keeping said valve body completely sealed at all times.

2. A fluid control valve comprising rigid end sections spaced apart and forming valve ports, fluid tight flexible bellows sealed at opposite ends thereof to said end sections and forming a completely imperforate tubular valve body for conducting the controlled fluid between said ports, a fixed annular valve seat on one of said end sections, a complementary movable valve member within and spaced inwardly from said bellows, positioning means located exteriorly of said bellows and having an extension extending to said movable member through and in sealed relation to walls of said bellows, and a fluid passageway extending through said positioning means extension between said movable valve member and said bellows, said movable valve member being supported by said positioning means and being movable thereby to and from said valve seat to close and open the valve, said bellows being displaced with movements of said positioning means but keeping said valve body completely sealed at all times.

3. A fluid control valve comprising rigid end sections spaced apart and forming valve ports, fluid tight flexible bellows sealed at opposite ends thereof to said end sections and forming a completely imperforate tubular valve body for conducting the controlled fluid between said ports, a fixed annular valve seat on one of said end sections, a complementary movable valve member within and spaced inwardly from said bellows, positioning means located exteriorly of said bellows and having an extension extending to said movable member through and in sealed relation to walls of said bellows, and a fluid passageway extending through said positioning means extension between said movable valve member and said bellows, said movable valve member being supported by said positioning means and being movable thereby to and from said valve seat to close and open the valve, said bellows being displaced with movements of said positioning means but keeping said valve body completely sealed at all times, the port of said one end section comprising inner and outer tubular portions of different internal diameters, said valve seat being on said outer portion and said inner portion being of the larger diameter to provide an enlarged passage for the fluid flow between itself and said movable valve member.

4. A fluid control valve comprising rigid end sections spaced apart and forming valve ports, fluid tight flexible bellows sealed at opposite ends thereof to said end sections and forming a tubular valve body for conducting the controlled fluid between said ports, a fixed valve member on one of said end sections, a complementary movable valve member within said bellows, positioning means located exteriorly of said bellows and having an extension extending to said movable member through and in sealed relation to walls of said bellows from outside said bellows, said movable valve member being supported by said positioning means and being movable thereby to and from said fixed valve member to close and open the valve, said bellows being displaced with movements of said positioning means but keeping said valve body completely sealed at all times, and a power operable mechanism connected with said positioning means outside said bellows for moving said positioning means to close and open the valve.

5. A fluid control valve comprising rigid end sections spaced apart and forming valve ports, fluid tight flexible bellows sealed at opposite ends thereof to said end sections and forming a tubular valve body for conducting the controlled fluid between said ports, a fixed annular valve seat on one of said end sections, a complementary movable valve member within said bellows, and positioning means extending to said movable member through and in sealed relation to walls of said bellows, said movable valve member being supported by said positioning means and being movable thereby to and from said fixed valve seat to close and open the valve, said bellows being displaced with movements of said positioning means but keeping said valve body completely sealed at all times, said positioning means including a ring sealed to and extending radially outside said bellows and having inside said bellows spaced radial legs connected with said movable valve member.

6. A fluid control valve comprising rigid end sections spaced apart and forming valve ports, fluid tight flexible bellows sealed at opposite ends thereof to said end sections and forming a tubular valve body for conducting the controlled fluid between said ports, a fixed annular valve seat on one of said end sections, a complementary movable valve member with said bellows, and positioning means extending to said movable member through and in sealed relation to walls of said bellows, said movable valve member being supported by said positioning means and being movable thereby to and from said fixed valve seat to close and open the valve, said bellows being displaced with movements of said positioning means but keeping said valve body completely sealed at all times, said positioning means comprising a ring sealed to and extending radially outside said bellows and having inside said bellows spaced radial legs connected with said movable valve member and rigid rods interconnecting said end sections outside said bellows and slidably holding said ring for movement along the axis of said valve seat.

7. A fluid control valve comprising rigid end sections spaced apart and forming valve ports, fluid tight flexible bellows sealed at opposite ends thereof to said end sections and forming a completely imperforate tubular valve body for conducting the controlled fluid between said ports, a fixed annular valve seat on one of said end sections, a complementary movable valve member within and spaced inwardly from said bellows, positioning means extending to said movable member through and in sealed relation to walls of said bellows, a fluid passageway extending through said positioning means between said movable valve member and said bellows, said movable valve member being supported by said positioning means and being movable thereby to and from said valve seat to close and open the valve, said bellows being displaced with movements of said positioning means but keeping said valve body completely sealed at all times, said positioning means including a ring sealed to and extending radially outside said bellows and having inside said bellows at least one radial leg connected with said movable valve member, and valve operating means comprising a ring gear rotatable about said sealed ring, mating screw threads respectively on the outer periphery of said sealed ring and the inner periphery of said ring gear, means confining said ring gear against axial movement, and means for rotating said ring gear to move said positioning means.

8. A fluid control valve as described in claim 7, said means for rotating said ring gear including a worm gear on the outer periphery of said ring gear and a rotatable worm meshing with said worm gear.

9. A fluid control valve as described in claim 6, and valve operating means including a piston fixed to at least one of said rods, a fluid pressure cylinder fixed to said sealed ring in driving relation to said piston, and means for supplying a pressure fluid into the said cylinder at either side of said piston to drive the cylinder and said ring in either direction along said rod.

10. A fluid control valve according to claim 9, said pressure fluid supplying means comprising a source of pressure fluid, a supply line and a return line connected with said source, a fluid line extending to each end of said cylinder, means for forcing fluid under pressure away from said source through said supply line, and valve means connected with said fluid lines, said supply line and said return line, said valve means in one position connecting the fluid line to one end of said cylinder with said supply line while connecting the other of said fluid lines with said return line, and, in another position, reversing these connections so that the supply line feeds pressure fluid into said other fluid line, said valve means being further operative in intermediate positions to block both of said fluid lines so as to hold said cylinder, said positioning means and said movable valve member in a selected position relative to said valve seat.

References Cited in the file of this patent

UNITED STATES PATENTS

| | | |
|---|---|---|
| 1,580,479 | Frankenfield | Apr. 13, 1926 |
| 1,679,774 | Larner | Aug. 7, 1928 |
| 2,133,983 | Gaston | Oct. 25, 1938 |
| 2,442,625 | Thomas | June 1, 1948 |
| 2,642,890 | Skewis | June 23, 1953 |

FOREIGN PATENTS

| | | |
|---|---|---|
| 551,475 | Great Britain | Feb. 24, 1943 |